March 3, 1964     D. E. LIPPKE     3,123,233
PORTABLE SILO UNLOADER
Filed Nov. 28, 1960     4 Sheets-Sheet 1
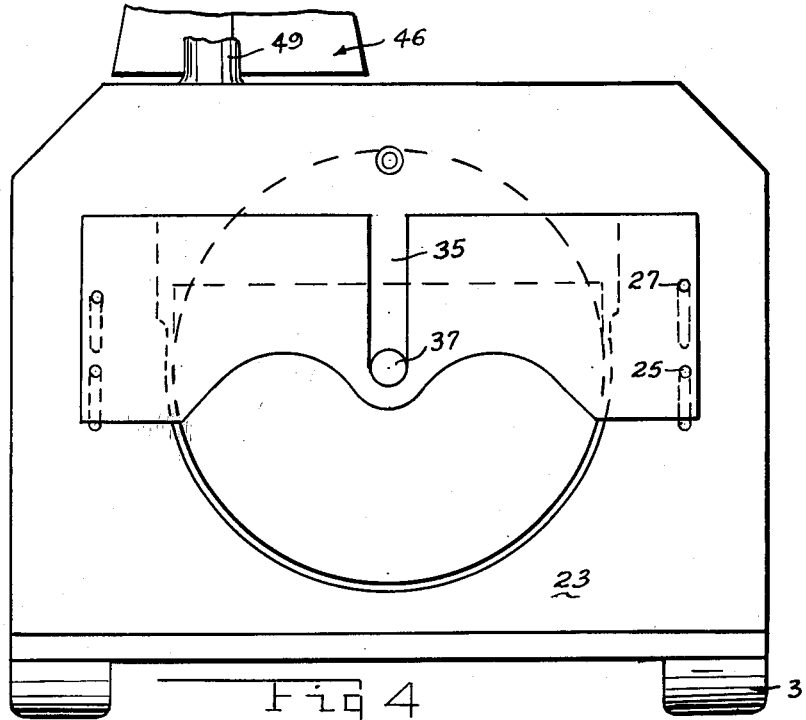
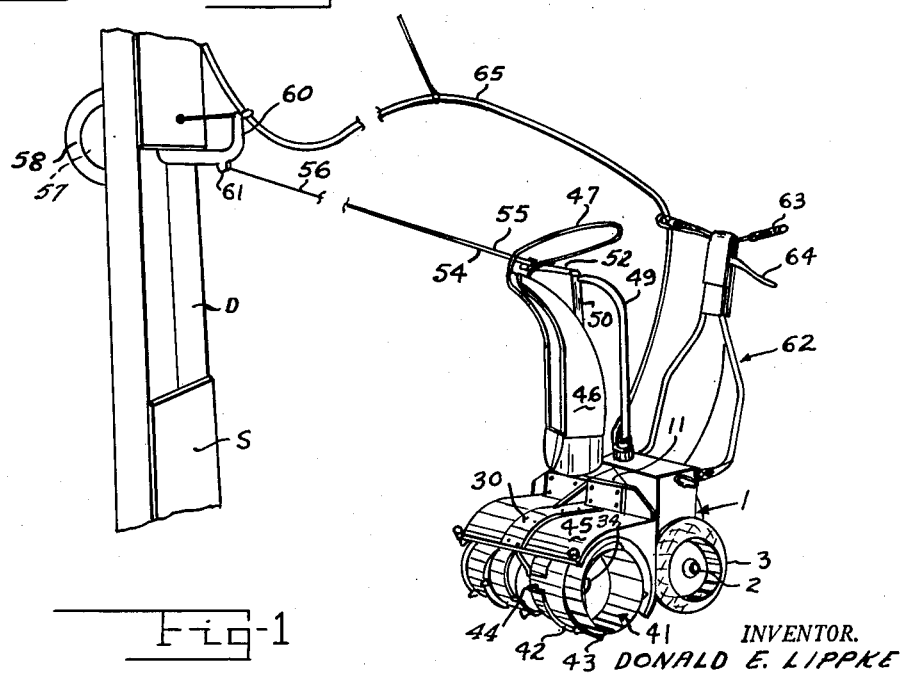
INVENTOR.
DONALD E. LIPPKE
BY Tom Walker
ATTORNEY

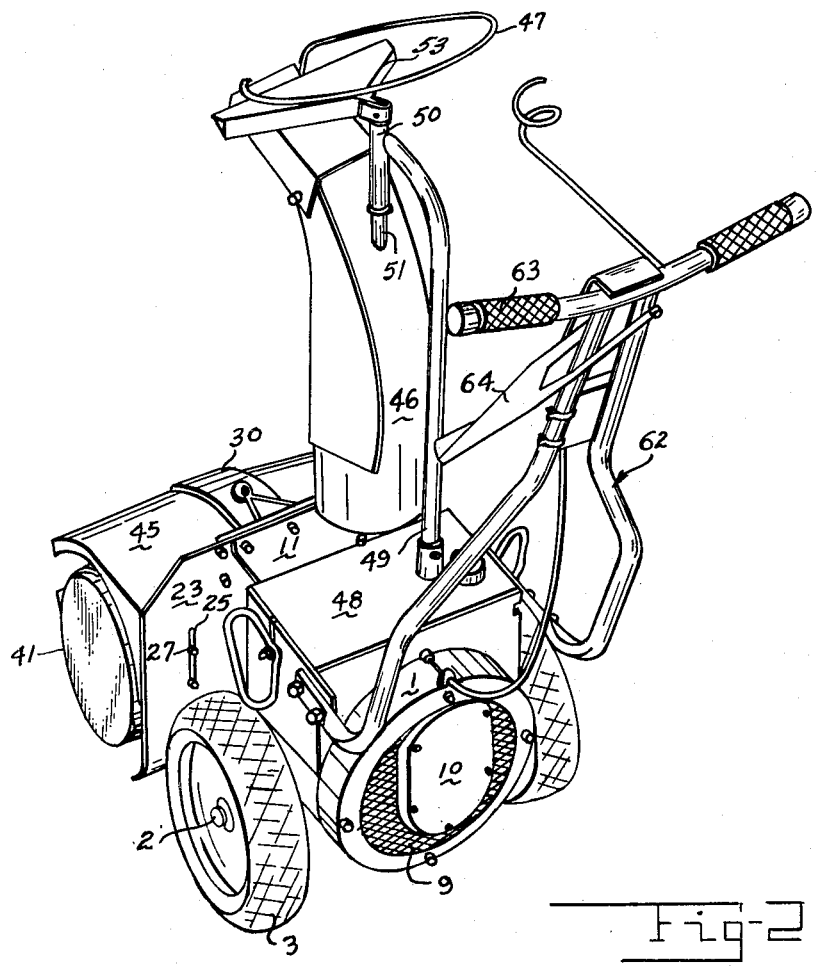

March 3, 1964 D. E. LIPPKE 3,123,233
PORTABLE SILO UNLOADER
Filed Nov. 28, 1960 4 Sheets-Sheet 3
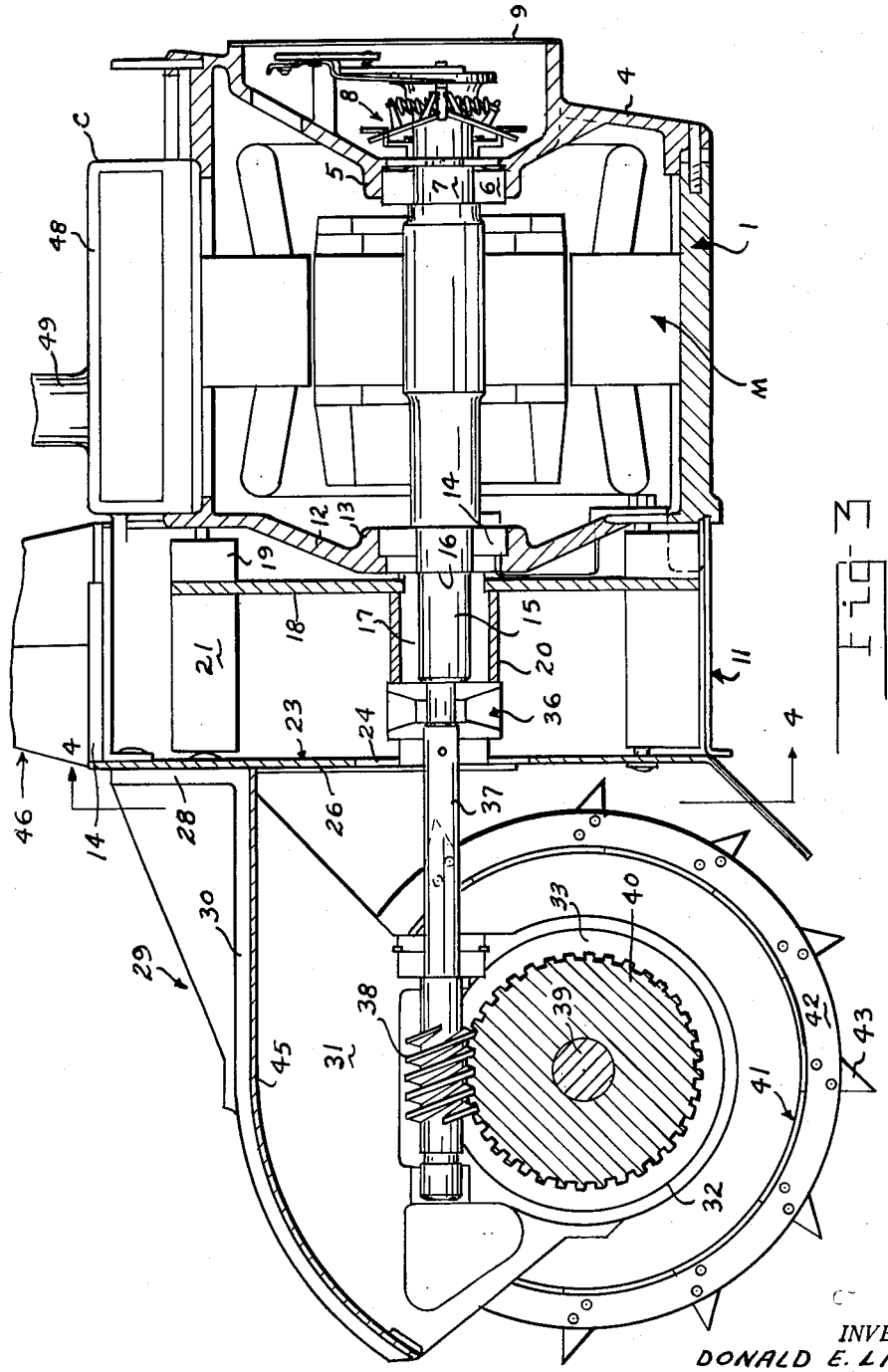
INVENTOR.
DONALD E. LIPPKE
BY Tom Walker
ATTORNEY March 3, 1964 D. E. LIPPKE 3,123,233
PORTABLE SILO UNLOADER
Filed Nov. 28, 1960 4 Sheets-Sheet 4

INVENTOR.
DONALD E. LIPPKE
BY Tom Walker
ATTORNEY

United States Patent Office 3,123,233
Patented Mar. 3, 1964

3,123,233
PORTABLE SILO UNLOADER
Donald E. Lippke, Vandalia, Ohio, assignor to Master Consolidated Inc., a corporation of Ohio
Filed Nov. 28, 1960, Ser. No. 71,979
20 Claims. (Cl. 214—17)

This invention is directed to novel digging apparatus particularly advantageous for unloading silage from silos and will be so described. However, it is to be understood that the application and form of embodiment of the invention is obviously not limited to that disclosed. Such is not intended.

The need for the present invention has been evident for some time. The historically conventional method of removing silage from a silo is to dig it out with a fork. This is obviously a laborious and inefficient procedure. The situation has been improved somewhat by the development of a number of automatic silo unloaders. However, these require a relatively permanent installation and are quite expensive. Moreover, they present maintenance problems and are not completely effective, particularly in a silo that is out of round.

The present invention presents new concepts in digging apparatus useful for unloading silos and similar applications and particularly fills a void in the silo unloading art. Its embodiment provides an easily manipulated self-propelled portable unit which can be readily moved from silo to silo to efficiently loosen the silage and toss it to a connected impeller formed to function at maximum efficiency and discharge it through a spout which is novelly and automatically controlled to maintain a selected direction of discharge. The invention units are exceedingly compact and their cost is only a fraction of that of the automatic unloader. Moreover, their elements are so designed to provide maximum efficiency and reduce maintenance to a minimum.

A primary object of the invention is to provide improvements in digging apparatus which renders such apparatus more economical to fabricate, more efficient and satisfactory in use, adaptable to a wide variety of applications and unlikely to malfunction.

Another object of the invention is to provide new concepts in portable equipment adaptable for unloading silage from silos and similar applications.

A further object of the invention is to provide improvements in portable equipment for unloading silage from silos and similar applications including novel digger units which also serve to provide for self-propulsion of such equipment.

An additional object of the invention is to provide portable equipment for digging and discharging silage from silos and similar applications incorporating highly effective and efficient dispersal means.

Another object of the invention is to enable an improved self-propelled digging unit providing maximum capacity for minimum cost.

An additional object of the invention is to provide a highly compact digger unit, the capacity of which can be controlled to suit the condition of the material handled thereby.

A further object of the invention is to provide a compact portable digger unit applicable to unloading silage from silos including novel means for controlling the discharge of the material handled thereby.

A further object of the invention is to provide improved apparatus for agitating and throwing silage and the like which in function provides an effective cooling of its drive means.

A further object of the invention is to provide a portable silo unloader possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a perspective view of an embodiment of the invention as particularly incorporated in a silo and adapted for unloading silage therefrom;

FIG. 2 is an enlarged, more detailed view of the unloading apparatus of FIG. 1;

FIG. 3 is a partial longitudinal cross-sectional view of the apparatus of FIG. 2;

FIG. 4 is a cross-sectional view taken on line 4—4 of FIG. 3;

Like parts are indicated by similar characters of reference throughout the several views.

Figure 5:
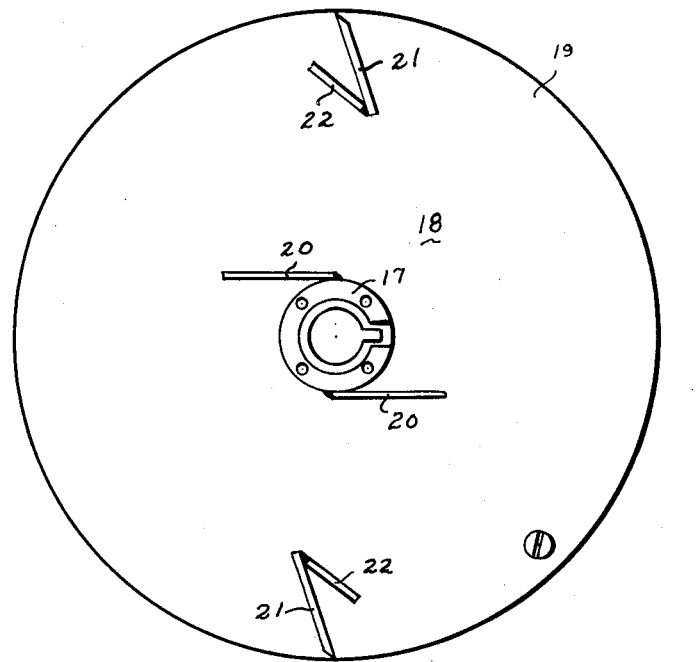
FIG. 5 is a cross-sectional view showing the impeller unit employed in the discharge section of the embodiment illustrated.
Figure 6:
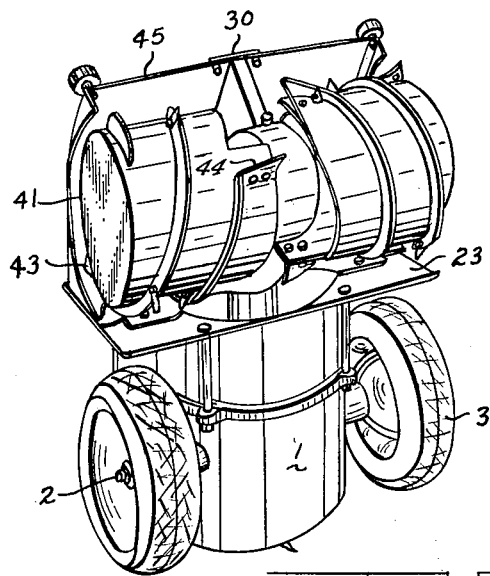
FIG. 6 is a bottom view of the apparatus shown in FIG. 2.

The unloader shown in FIG. 1 is positioned within a silo S having a discharge opening D. The unloader apparatus illustrated includes a housing 1 containing a motor M and having a pair of laterally projected axles 2 to its underside. Each of the respective axles rotatably mount a wheel 3 at its projected extremity and the housing 1 is thereby rendered mobile.

The housing 1 is closed to one end by an end bell 4 which is variously apertured and dished inwardly of the housing within its periphery. The innermost portion of the end bell 4 has an aperture defined by a cylindrical projection 5. A bearing 6 within the projection 5 rotatably mounts one end of the motor shaft 7 which projects therethrough. Operatively related to the projected extremity of shaft 7 in the dished portion of the end bell 4 is a centrifugal switch system 8 which is incorporated in the controls for the motor M. (Since the motor control system may be conventional its details are not essential to the invention disclosure and therefore need not be further described herein.) The end bell 4 is covered by a grate 9 including a plate 10 protecting the centrifugal switch apparatus 8.

A generally cylindrical shell 11 is fixed to provide an axial extension on the opposite end of the housing 1, which is bridged by a plate 12. The plate 12 is slotted and formed to conically project within the shell 11. An aperture is defined at the apex or center of plate 12 by a cylindrical hub portion 13 accommodating a bearing 14 for the motor shaft 7 which projects therethrough. The form of the shell 11 is modified at its upper surface to provide a vertically projected chute 14 opening to one side.

The projected extremity 15 of the shaft 7 within the shell 11 is uniformly reduced in dimension to provide a shoulder 16 thereon substantially co-planar with the conically projected extremity of the motor housing end plate 12. A sleeve 17 is fixed concentric with the reduced extremity 15 of shaft 7 to have its inner end in abutment with the shoulder 16. The end of the sleeve 17 abutting shoulder 16 is uniformly reduced in peripheral dimension to mount an impeller plate 18 thereabout in fixed relation thereto. Plate 18 is thus positioned immediately adjacent end plate 12 at its center.

Circularly spaced rectangular fan blades 19 are fixed to project from plate 18 adjacent its periphery and in the direction of the plate 12. The exterior configuration of the plate 12 provides that the fan blades 19 are concentrically disposed in spaced relation to its projected conical surface portion within the shell 11. Thus it will be seen that on rotation of the plate 18 with motor shaft 7, the fan blades 19 will induce a flow of cooling air through the motor M. The free passages of this cooling air is enabled by the apertures in the plates bridging either end of the housing 1.

Connected tangential to the sleeve 17 at diametrically opposed positions are rectangular agitator blades 20. The blades 20 project oppositely but in a generally parallel sense and are arranged perpendicular to the face of plate 18 remote from the motor housing 1. Mounted perpendicular to the same face of the plate 18, at diametrically opposite peripheral positions in a sense substantially at right angles to the orientation of the agitator plates 20, are impeller or throwing blades 21. Each of the blades 21 is similarly inclined to a radius of the plate 18 and is strengthened by a gusset 22 which has an even greater inclination to the same radius. Note FIG. 5 of the drawings in this respect.

A generally rectangular plate 23 overlies and is bolted to the end of shell 11 remote from the motor housing 1. The plate 23 is peripherally extended relative the shell and oriented at right angles to its longitudinal axis. Its upper portion provides the forward wall of the chute 14 while a relatively central aperture 24 therein provides an opening to the shell 11 which is coextensive with approximately the lower two-thirds of the housing provided thereby. To either side of this opening 24, adjacent its upper extremities, are vertically spaced, vertically elongated slots 25. Overlying the upper portion of the outermost face of the plate 23 is a gate plate 26 adjustably engaged thereto by means of bolts 27 extending through the slots 25 to either side of the aperture 24. The gate plate is adapted thereby to be selectively adjusted in a sense vertically of the plate 23 to selectively overlap the aperture 24 and vary the opening provided to the housing defined by the shell 11 and the plate 23. It will be observed from the drawings that the portion of the plate 23 extending below the shell 11 is bent forwardly at a 45° angle.

Bolted across the top of the plate 23 is the anchor plate 28 of a frame 29. Projected forwardly from the center of the anchor plate 28 is an arcuate flange 30. The flange 30 is initially generally perpendicular to the plate 22 and curved slightly downwardly at its projected extremity. A web plate 31 depends centrally from the flange 30, coextensive with its longitudinal center line, to support a ring 32 formed integral with its dependent extremity. The ring 32 has a closure plate 33 to one side wherein a central aperture is defined by a laterally projected cylindrical hub portion 34.

It should be noted here that a vertical notch 35 is provided in the center of the gate plate 26 opening from the top and extending substantially the depth thereof. A flexible coupling 36 connected to the motor shaft 7 through the medium of the sleeve 17 serves to support a shaft extension 37 which extends from the housing defined by the shell 11 through aperture 24 in plate 23 and the notch 35 in the gate plate 26. The shaft extension 37 is bearingly supported in the web plate 31 co-axial with the motor shaft 7 to project across the upper portion of the ring 32. The portion of shaft 37 bridging the ring 32 an integrated worm 38.

A shaft 39 is bearingly supported in the hub 34 at right angles to the motor shaft 7 and the extension 37. The shaft 39 projects equally to either side of the web plate 31 and has a worm gear 40 fixed at its center to mesh with the worm 38. Fixed to the shaft 39 equi-distantly to either side of the web plate 31 by means of cylindrical hub portions, are discs mounting cylindrical drums 41.

Pairs of flights 42, arranged in peripherally projected relation to each drum 41 in the form of a helix, extend in screwlike fashion from the end most remote from the web plate 31 to the end most adjacent thereto. The flights 42 have peripherally projected teeth 43 fixed to their trailing edges. In addition, the terminal portions of the flights have laterally extending paddle elements 44 which are diametrically projected from the drums and extend beyond their inner adjacent edges. The arrangement is such that the flights provide a screwing action towards each other terminating at the paddles 44.

Hood elements 45 are supported by the flange 30 to either side of the web 31. The hoods 45 thereby form shields over and in spaced relation to the drum elements 41. It may be seen from the drawings that the drums 41 are laterally spaced and depend substantially below the web 31. Immediately to the rear of the space therebetween is the opening to the shell 11 below which may be observed the deflected portion of the plate 23.

A spout 46 providing a vertical extension of the discharge chute 14 has its base mounted to be freely rotatable thereabout. The curved upper or terminal portion of this spout 46 is pivoted and adjustable to determine the angle of discharge. A bail 47 connects to this terminal portion to enable its manual adjustment, if required.

A rectangular case C defined at the upper surface of the housing 1 serves to house terminals for the control circuit of the motor M. The case C has a top cover plate 48. Projected in fixed relation to the cover plate 48 is a mast 49 which is initially vertical but has its upper extremity inclined forwardly over the curved upper portion of the chute 46 adjacent thereto. Fixed to the forward extremity of the mast 49 is a vertically oriented bearing tube 50 rotatably accommodating a pivot rod or spindle 51 projected from the outer surface of the spout 46. The bearing tube 50 and rod 51 are so arranged to provide a suspension of the spout 46 by means of the spindle or rod 51. This enables a free turning of the spout about the discharge chute 14 of which it forms an extension.

A triangular arm 52 is fixed by a strap 53 defining its apex to project in a plane perpendicular to the upper extremity of rod 51 and over the spout 46. Cables 54 and 55 respectively connect at one end to the lateral extremities of the arm 52. The other ends of the cables 54 and 55 are joined and connected to the hook extremity of a strap 56. The strap 56 constitutes the outer end of a tension spring 57 coiled on a reel 58. The reel 58 rotatably mounts on a pivot supported by an arm fixed to a clamp 60. An eye element 61 fixed to the clamp serves as a guide for the strap 56. As oriented, the hook connector element of the strap 56 prevents complete withdrawal of the spring in the reel 58. As may be seen with reference to FIG. 1 of the drawings, under operating conditions, when the invention apparatus is employed in a silo, the clamp 60 may be affixed to the frame defining the discharge opening from the silo whereupon, irrespective of the movement of the invention apparatus, the arm 52 will be controlled by the cables 54 and 55 under tension of the spring 57 to maintain the spout 46 directed to the opening D from the silo.

It may also be seen from the FIG. 1 of drawings that the invention apparatus incorporates an operating handle assembly 62 extending from the housing 1 to the rear and upwardly thereof. At the upper end of the handle assembly are laterally projected handle bars 63 and incorporated therein is a "dead man" control lever 64. The operating lever 64 is so connected with the motor controls that in the position biased downwardly from a handle bar 63, as shown, the motor is inoperative. Drawing the lever 64 upwardly to the handle bar will close the control circuit to cause drive of the motor shaft 7 and, obviously release thereof terminates the operation of the invention apparatus. As shown, a power cable 65 is connected to the motor and extends for connection to a suitable source of power.

The invention apparatus may be best understood from a description of its operation. The entire apparatus is portable and can be carried into a silo and placed on top of the compacted silage therein without particular difficulty. As the invention unit is positioned on the silage the clamp 60 is affixed as schematically indicated in FIG. 1 of the drawings to the frame which defines the opening D through which the silage is to be discharged. Having connected the cable 65 to a source of power, the motor M is then energized by pulling upwardly on the control lever 64 to hold it to the handle bar 63. By means of the handle bars 63 the entire apparatus may be guided over the silage. The operation of the motor M causes a drive through the shaft 7 and its extension 37 to the shaft 39 mounting the drums 41. The joint drive of the drums 41 produces a screwing action of the flights 42 on the compacted silage. As this occurs the teeth 43 commence to break up the compacted silage. The silage so loosened is screwed by the flights 42 inwardly intermediate the drums 41 where it is picked up and projected rearwardly and intermediately of the drums by the paddle elements 44. It will be recognized that the opposite screwing motion of the flights 42 will produce a forward propulsion of the entire assembly, guided by control of the handle bars 63. The projection of the loosened silage by the paddle members 44 is so arranged to direct the silage through the opening in the plate 23 as modified by the gate plate 26, and against the impeller plate 18 intermediately of the agitator plates 20 and the throwing blades 21. This insures that the silage will reach the impeller plate before it is picked up by the agitator plates. In this way the full benefit of the entire surface of the agitator plates is applied to the silage directed into the shell 11. The agitator plates produce a further break-up action on the silage and throw it outwardly to be picked up by the throwing blades 21. The blades 21 then project the silage under the influence of centrifugal force through the chute 14 and the spout 46. As mentioned previously, as the entire unit is guided by means of the handle bars 63 over the compacted silage in various directions, the tension of spring 57 is applied through cables 54 and 55 to the arm 52 fixed to the spindle 51 on the spout 46 causing a constant turning of the spout to adapt it to be directly oriented at all times toward the opening D from the silo. Thus, the apparatus may be moved all about and still maintain an effective direct discharge of the silage on which it operates. To interrupt the operation of the unit, one need only release the dead man control lever 64.

It will be seen from the above that the device is very simple and very efficient in operation. The drums with their projected flights and teeth 43 very effectively serve their multiple function of breaking up the compacted material and moving it in intermediately thereof and by means of the paddles 44 into the shell 11 for effective discharge in a controlled fashion through the discharge opening from the silo. In the process of the operation of the motor the fan blades 19 on the impeller assembly throw a flow of cooling air through the motor, enabled by the apertured end plates on the housing 1.

The advantages of the gate plate 26 are to be particularly noted. It enables the opening of the shell 11 to be increased for light weight fluffy materials and closed down for dense compact silage to avoid getting too much material into the impeller at one time. This device allows the machine to be used at maximum capacity under a variety of conditions. It also restricts the entry area to the segment of the impeller rotation immediately preceding the discharge and thus eliminates friction losses which could occur around the remainder of the housing.

From the above it becomes apparent that a device is provided which is capable of being advantageously applied to a variety of digging applications. It is very effective in that the dispersal of the material dug is quickly and efficiently accomplished.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. Apparatus for unloading silage and the like including a motor unit having a projected drive shaft, an impeller on said drive shaft, a worm gear coupled to said drive shaft, a shaft at right angles to said drive shaft driven by said worm gear and having propulsion means in spaced relation thereon, said propulsion means including elements which in the movement thereof over silage and the like will dig and throw the silage material to said impeller, agitator and throwing elements radially spaced on said impeller to define an impeller entry area therebetween oriented for impact thereon of the silage thrown from said propulsion means whereupon said agitator elements are operative to break up and radially disperse the silage for centrifugal discharge by said impeller throwing elements, means defining a chute operatively associated with said impeller for channeling the silage discharged therefrom, and means for orienting said chute to discharge in a fixed direction irrespective of the orientation or direction of movement of said propulsion means.

2. Apparatus for unloading silos and similar applications comprising a mobile motor unit, means defining an impeller housing forming an extension at one end, said motor unit having a drive shaft projected in said housing, impeller means on said drive shaft in said housing, means providing an extension of said drive shaft, support means connected to said impeller housing rotatably mounting a shaft at right angles thereto operatively coupled to said shaft extension, propulsion elements fixed to said last named shaft and operative thereby to induce movement of said motor unit on drive thereof, said elements having means fixed thereto operating to dig and throw material from the surface over which they move to said impeller means for discharge from said impeller housing thereby.

3. Apparatus for unloading silos and the like including a mobile motor unit having a projected drive shaft, means defining a housing about the projected portion of said drive shaft having a connected discharge chute, a drive element aligned with and coupled to said drive shaft, said drive element having a driven shaft coupled at right angles thereto, digger means on said driven shaft rendered operative by operation of said motor unit to effect a propulsion thereof and including means acting simultaneously to dig and throw material to said housing, impeller means on said drive shaft in said housing operative to receive and throw said material through said discharge chute, means connected to said discharge chute for maintaining its discharge oriented in a predetermined direction irrespective of the direction of movement of said motor unit and adjustable gate means on said housing for controlling the delivery of material from said digger means to said housing.

4. Apparatus for unloading silage and the like including a motor unit having a projected drive shaft, means defining a housing about the projected portion of said drive shaft having a connected discharge chute, transversely oriented propulsion means coupled to said drive shaft including peripherally projected means operable on drive thereof to dig and throw to said housing material over which said peripherally projected means are positioned and plate means on said drive shaft in said housing having a agitator and throwing blades in radially and circumferentially displaced relation thereon respectively oriented to initially receive the thrown material therebetween and operative to then agitate and break up material received in said housing and submit it to the throwing blades for discharge through said discharge chute.

5. Apparatus for unloading silage and similar applications including a motor unit having a projected drive shaft, means defining a housing including a discharge chute forming an extension of said motor unit about the projected portion of said drive shaft, propulsion means connected to said drive shaft including elements operative to dig and throw material thereunder to said housing and, means oriented on said motor shaft within said housing to receive the material and discharge it through said chute.

6. In digging equipment, digger apparatus consisting of a pair of drums arranged in coaxial relation, each said drum having projected flights arranged in a screw-like orientation, teeth projected relative said flights and paddle means formed integral with the adjacent terminal portions of said flights and means connecting and in driving relation to said drums whereby rotation of the drums about their longitudinal axes by said drive means provides propulsion thereof, a digging function of said teeth, a directing of material dug by said teeth to said paddle means and a throwing of the material to one side of the drums by said paddle means.

7. For use in combination with digging apparatus a disc element for positioning in the path of material thrown thereby including agitator blades fixed to project perpendicular to said disc adjacent its center and in generally parallel spaced relation to opposite sides thereof and inclined throwing blades fixed to said disc adjacent its outer periphery at positions oriented in a sense substantially at right angles to the positions of said agitator blades, a space being defined between said agitator and throwing blades in a radial sense for receipt of materials from the digger apparatus to enable a full engagement thereof by said agitator blades and for break up and dispersal thereby to said throwing blades on rotation of said disc.

8. An impeller unit consisting of disc means including a central aperture, agitator blades fixed to project from one face of said disc means tangential to the aperture and throwing blades fixed to project from said one face of said disc means adjacent its outer periphery and oriented at an inclination to radii of said disc, said agitator and throwing blades being radially displaced to define a point of entry to said disc means intermediately thereof.

9. Impeller apparatus including a plate having a central aperture defined by a relatively projected hub, impact blades tangential to said hub at one face of said plate and projecting oppositely therefrom and throwing blades projected from said one face of said disc radially displaced relative said impact blades and oriented at an inclination to radii of said plate.

10. Unloading apparatus including a mobile impeller unit consisting of a housing having impeller means rotatably mounted therein and a discharge chute, discharge spout means forming an extension of and freely rotatable about said discharge chute, mast means in connection with said impeller unit rotatably suspending the spout therefrom for rotation about said chute, and means connecting to said spout and adjacent a discharge area to maintain a tension on said spout to orient it to said discharge area irrespective of movement of the housing.

11. Apparatus for unloading silage and the like including a mobile motor unit having a projected drive shaft, digger means coupled to said drive shaft, an impeller plate fixed on said drive shaft intermediate said digger means and motor unit, agitator blades fixed adjacent the center of said plate to project perpendicular thereto and towards said digger means, inclined throwing blades fixed to said plate adjacent its outer periphery at positions oriented in a sense substantially at right angles to the positions of said agitator blades, a space being defined between said agitator and throwing blades for receipt of material from the digger means for engagement by said agitator blades and dispersal to said throwing blades on rotation of said drive shaft.

12. A unit for unloading silos and similar applications including a mobile motor unit having a projected drive shaft, a disc fixed to said drive shaft adjacent said motor unit, fan blades on one side of said disc projected toward said motor unit and agitator blades on the other side of said disc projected oppositely, means coupled to said motor shaft operable to dig compacted material and throw such material to said disc for discharge from said agitator blades, drive of said motor shaft inducing a circulation of air over said motor unit through the medium of said fan blades, and a housing in surrounding relation to said disc having a peripheral discharge chute encompassing both said fan blades and said agitator blades.

13. Apparatus for unloading silage and the like including a motor unit having a projected drive shaft, means defining a housing about the projected portion of said drive shaft having a connected discharge chute, transversely oriented digger means coupled to said drive shaft operable on drive thereof to dig and throw material over which they are positioned to said housing, and means on said drive shaft in said housing having agitator and throwing blades in radially and circumferentially displaced relation thereon operative to first agitate and break up material received in said housing and submit it to the throwing blades for discharge through said discharge chute.

14. Impeller apparatus including a plate having a central aperture accommodating a hub, a pair of impact blades connected at their inner ends at diametrically opposite points on said hub and extending tangential thereto, in opposite directions, in generally parallel relation, and throwing blades projected from said plate adjacent its outer periphery, displaced circumferentially and radially with respect to said impact blades.

15. Apparatus for unloading silage and the like utilizing impeller apparatus according to claim 14, characterized by means directing loosened silage to said plate, including a housing and an opening in said housing located to admit the silage to said plate intermediate said impact blades and said throwing blades.

16. A silage unloader or the like, comprising a motor unit having a projected drive shaft, means defining a housing about the projected shaft having a connected peripheral discharge chute and forwardly and rearwardly directed openings, propulsion means having digger elements thereon supported forwardly of said housing and driven by said shaft to pick up and feed material into said housing by way of a forwardly directed opening therein, and an impeller disc in said housing rotatable with said shaft, said impeller disc presenting a forwardly directed face having radially spaced sets of agitator and impeller blades thereon, said forwardly directed opening in said housing admitting material to said disc in an area intermediate said sets of blades.

17. Silage unloading apparatus including a mobile impeller unit providing a housing having impeller means rotatable therein and a communicating discharge chute, means for feeding silage to said impeller means for centrifugal escape by way of said chute, spout means having one end in communicating pivotally connected relation to said chute, said spout means rising in elevated relation to said chute, a stationary mast on said unit, and means on said mast relatively remote from said one end of said spout means suspending said spout means, said last named means providing rotary bearing support for said spout means.

18. Digging apparatus comprising, a mobile motor unit having a projected drive shaft, screw-like propulsion means connected to said drive shaft, means connected to said propulsion means operable to dig and throw toward said motor unit the material over which said propulsion means travels, impeller means in advance of said motor unit operative to receive on a forwardly disposed face thereof and centrifugally disperse the material thrown, means communicating the interior of the motor unit with a rearwardly disposed face of said impeller means and blade means projected from said impeller means in the direction of said motor unit operative to continuously flow cooling air through said motor unit as long as said impeller means operates.

19. Digging apparatus comprising, a pair of screw-like digging elements connected abreast of one another adapted to dig material and throw it intermediately and to one side thereof, a housing to said one side of and centered relative said digging elements adapted to receive the material thrown, an impeller unit in said housing including separate means for agitating and throwing the material received therein and providing an entry area for said material therebetween, for impact thereon previous to engagement by said agitating means which are operative to break up the material and disperse it to said throwing means and means in communication with said impeller unit to direct the materials thrown thereby from said housing.

20. A silage unloader or the like, comprising a motor unit having a projected drive shaft, means defining a housing about the projected shaft having a connected peripheral discharge chute and forwardly and rearwardly directed openings, digger means supported forwardly of said housing and driven by said shaft to pick up and feed material into said housing by way of a forwardly directed opening therein, an impeller disc in said housing rotatable with said shaft, said impeller disc presenting a forwardly directed face having radially spaced sets of agitator and impeller blades thereon, said forwardly directed opening in said housing admitting material to said disc in an area intermediate said sets of blades and other blade means on a rearwardly directed face of said disc serving the dual purpose of generating air flow for cooling said motor unit and of expelling to said chute materials tending to travel around said disc to said rearwardly directed face thereof.

References Cited in the file of this patent
UNITED STATES PATENTS

| | | |
|---|---|---|
| 1,587,449 | Wandscheer | June 1, 1926 |
| 1,900,213 | Wenberg | Mar. 7, 1933 |
| 2,431,477 | Hill | Nov. 25, 1947 |
| 2,717,812 | Egilitis | Sept. 13, 1955 |
| 2,816,804 | Harrer | Dec. 17, 1957 |
| 2,877,907 | Buschbom | Mar. 17, 1959 |
| 2,883,076 | Palmer | Apr. 21, 1959 |
| 2,883,196 | Fischer | Apr. 21, 1959 |
| 2,911,116 | Anderson | Nov. 3, 1959 |
| 2,941,843 | Crump | June 21, 1960 |
| 2,958,412 | Buschbom | Nov. 1, 1960 |
| 3,032,169 | Bridgewater | May 1, 1962 |